April 10, 1928.

J. ANDERSON

PULVERIZED FUEL BURNING FURNACE

Filed May 13, 1921

Inventor
John Anderson
By Attorneys

April 10, 1928.

J. ANDERSON

PULVERIZED FUEL BURNING FURNACE

Filed May 13, 1921

April 10, 1928. 1,665,399
J. ANDERSON
PULVERIZED FUEL BURNING FURNACE
Filed May 13, 1921 6 Sheets-Sheet 5

April 10, 1928.

J. ANDERSON 1,665,399

PULVERIZED FUEL BURNING FURNACE

Filed May 13, 1921

Patented Apr. 10, 1928.

1,665,399

UNITED STATES PATENT OFFICE.

JOHN ANDERSON, OF MILWAUKEE, WISCONSIN, ASSIGNOR TO COMBUSTION ENGINEERING CORPORATION, A CORPORATION OF NEW YORK.

PULVERIZED-FUEL-BURNING FURNACE.

Application filed May 13, 1921. Serial No. 469,131.

My invention relates to furnaces especially suited for burning powdered or pulverized fuel for the generation of steam,—although in some of its phases the invention may be also adapted and extended to the burning of other fuels, and to uses other than with steam boilers. My aim is not only to secure thorough and efficient combustion of the fuel and full utilization of the hot furnace gases, but also to protect and preserve the furnace structure from rapid deterioration by the intense heat developed therein, and to minimize difficulties and deteriorating influences due to the effect of the heat on incombustible residues from the fuel. A further object of my invention is the improvement of furnace construction in various ways.

How these and other advantages can be secured through my invention will appear from my description hereinafter of the best form or embodiment of the invention at present known to me.

In the drawings, Fig. 1 is a front elevation of a steam boiler with a furnace and setting constructed in accordance with my invention.

Figure 1:
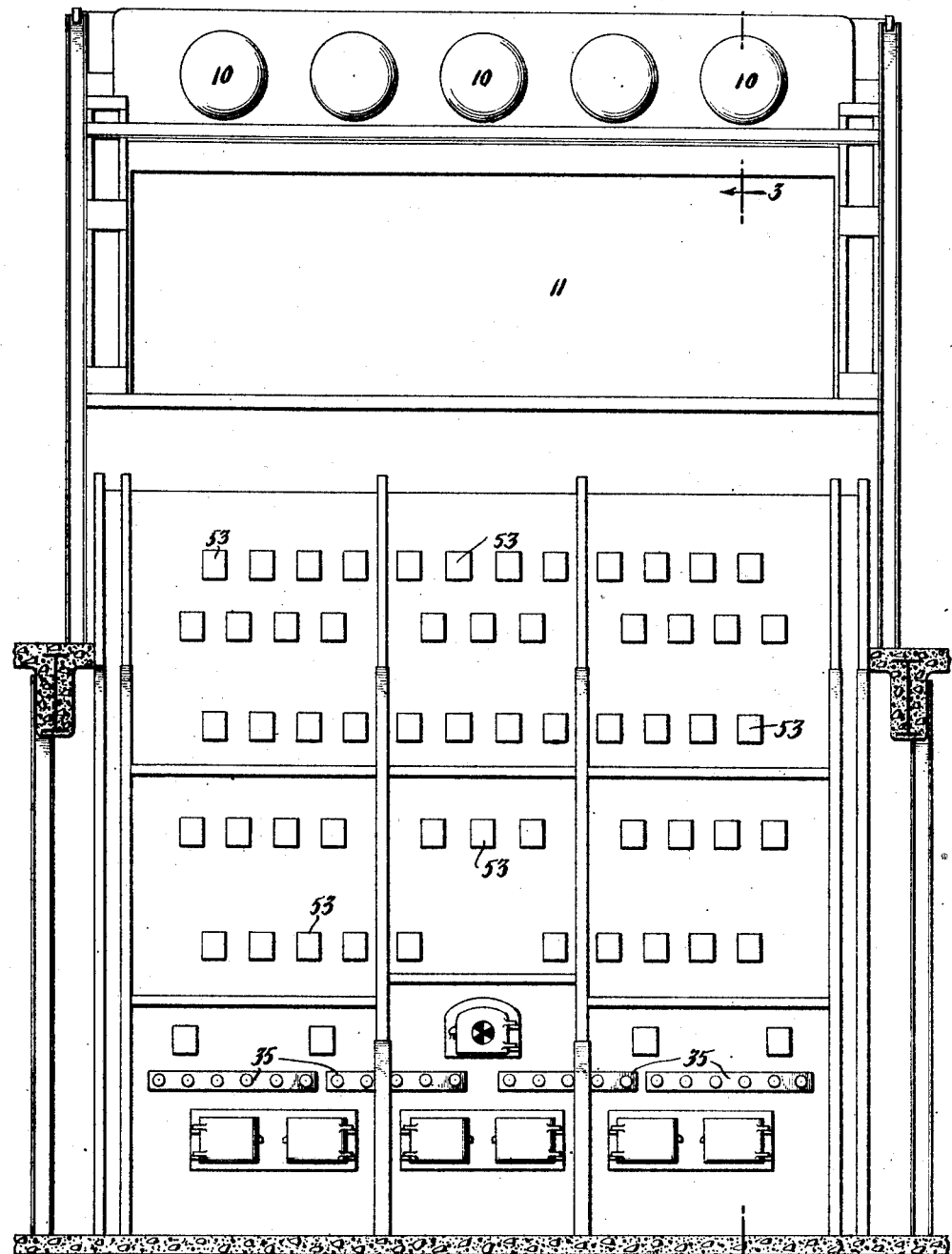
Figure 2:
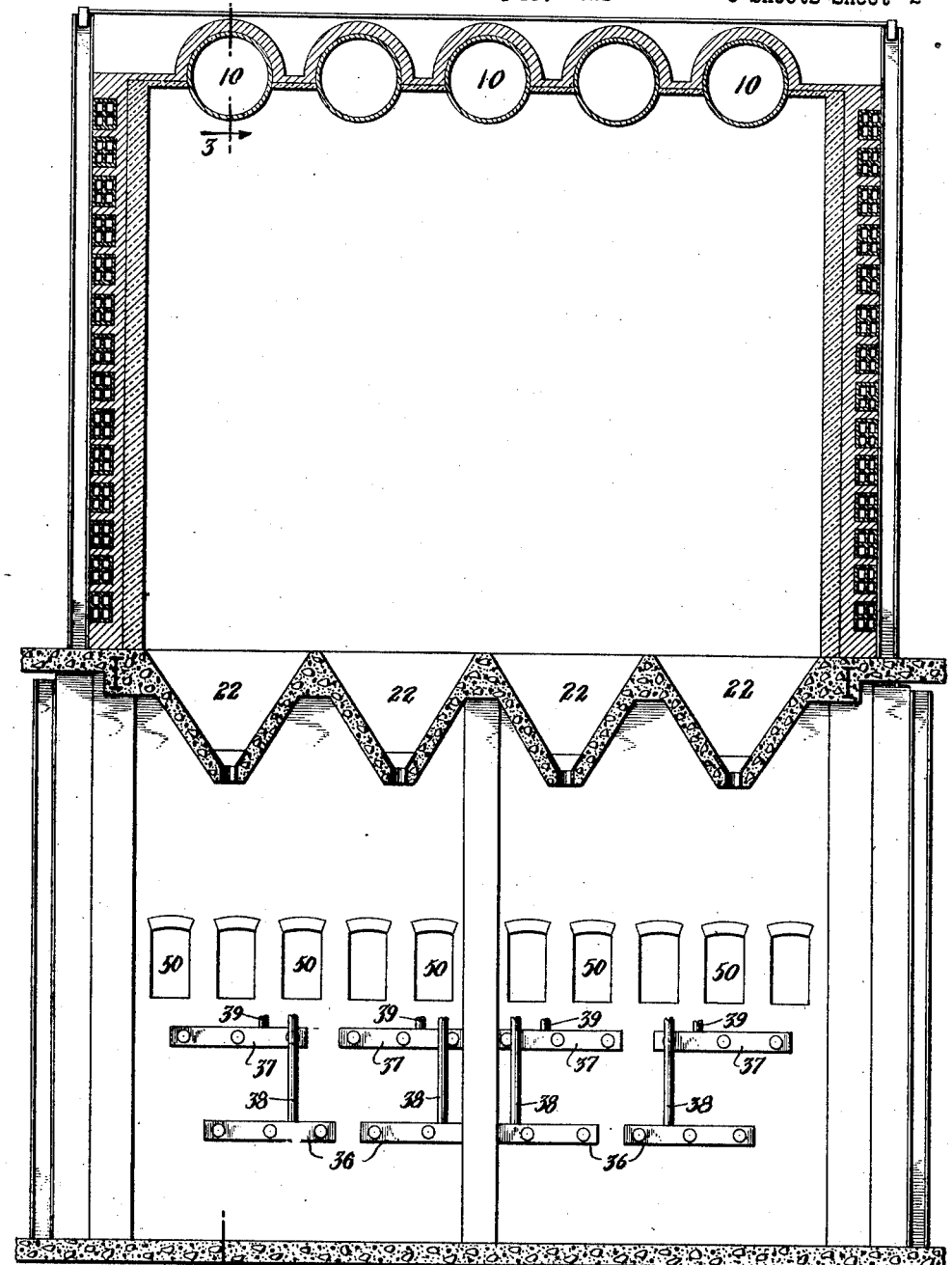
Fig. 2 is a rear elevation with the upper portion of the furnace or setting in section as indicated by the line 2—2 in Fig. 3, and most of the boiler structure broken away or omitted.
Figure 3:
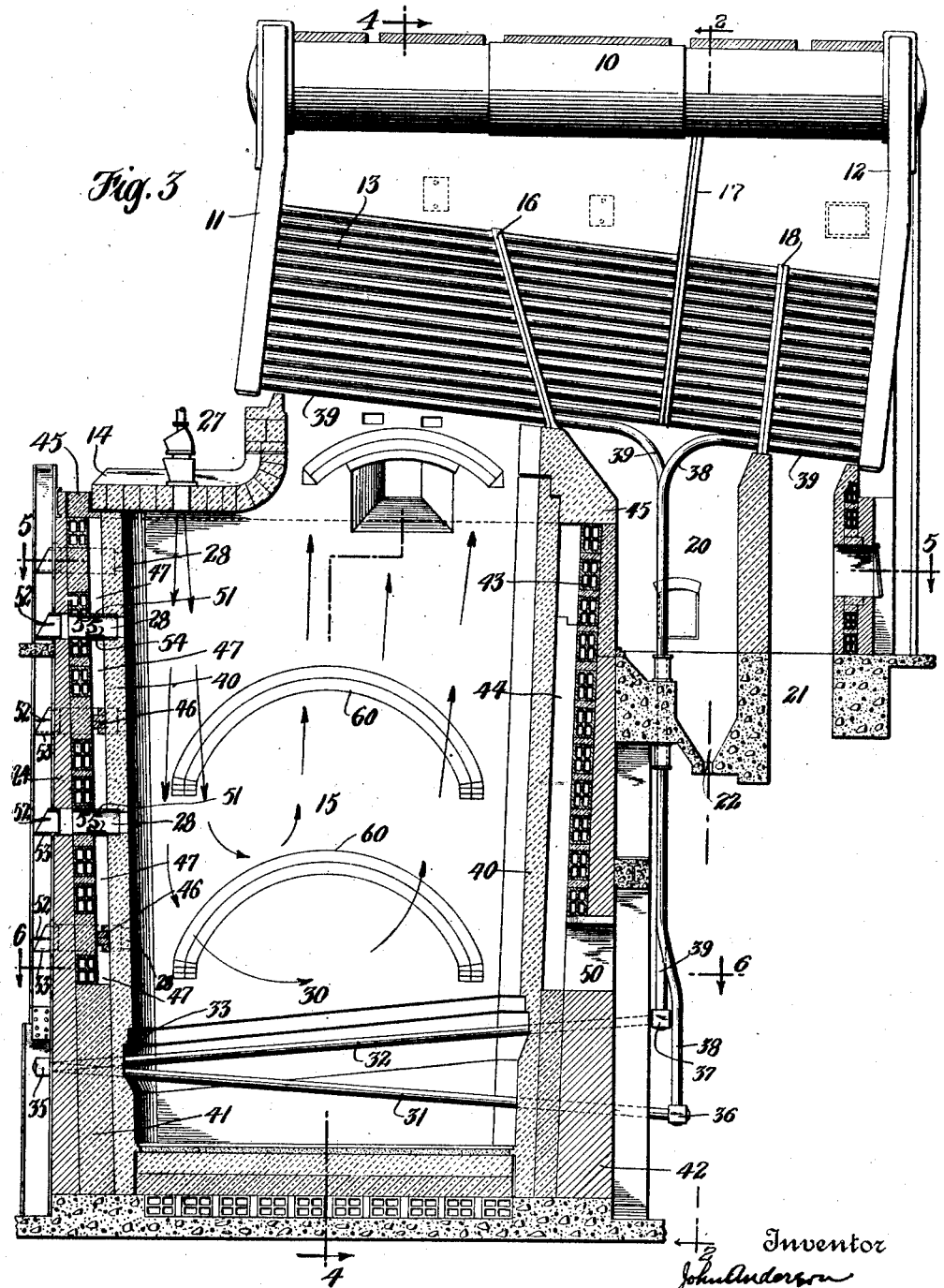
Fig. 3 shows a vertical longitudinal section through the furnace and the boiler setting, taken as indicated by the line 3—3 in Figs. 1, 2, and 4,—the boiler being shown unsectioned.
Figure 5:
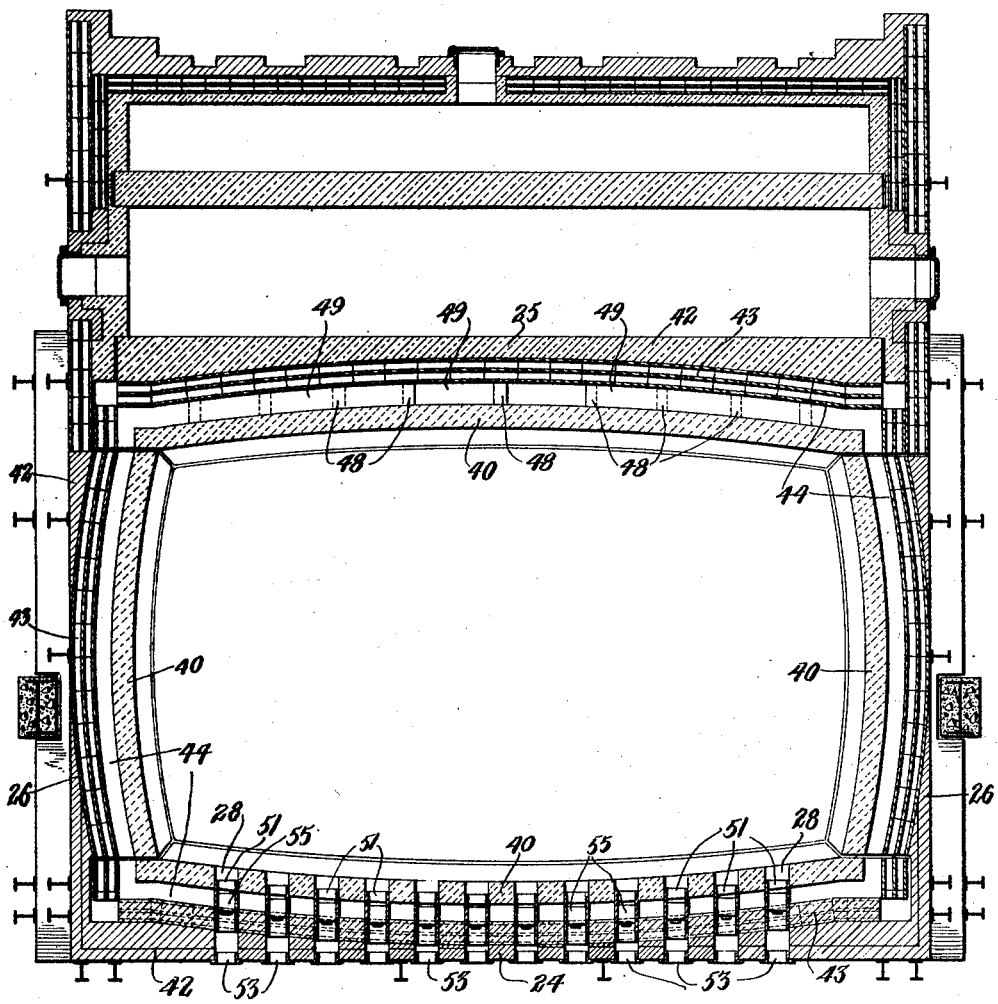
Figure 6:
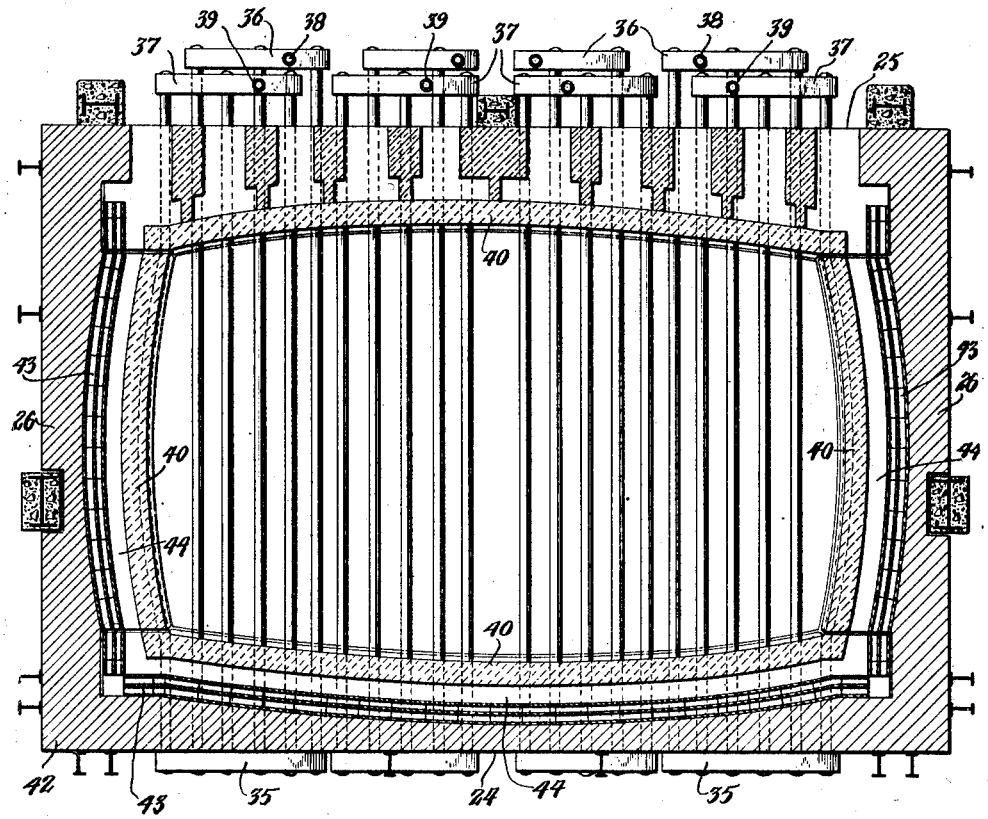

Figs. 5 and 6 show horizontal sections through the furnace structure and the setting, taken as indicated by the lines 5—5 and 6—6 in Fig. 3,—certain parts being omitted from Fig. 5 for the sake of greater clearness of illustration.

Referring to Figs. 1, 2, 3 and 4, it will be seen that the boiler here shown is of the general Edgemoor type, comprising steam drums 10 with depending front and rear headers 11 and 12 connected by a bank of water tubes 13 inclined upward toward the front. The front ends of the tubes 13 overlie an opening in the top or roof 14 of the combustion chamber 15 of the furnace, and the furnace gases traverse the tubes 13 in a succession of up and down transverse passes that are partly defined by the successive baffles 16, 17 and 18 in the tube bank. The gases return from the second (downward) pass across the tubes 13 to the third (upward) pass through a chamber 20 in the boiler setting at the rear side of the combustion chamber 15, and finally leave the boiler through a downward passage 21 in the setting. At the bottom of the return chamber 20 are a number of soot-hoppers 22 for periodically discharging soot, dust, etc. that precipitate and collect in said chamber.

Referring, now, to Figs. 3, 4, 5 and 6, it will be seen that the combustion chamber or furnace proper 15 is a large, deep, oblong unobstructed chamber, quadrangular or approximately rectangular in plan, enclosed by upright front, rear and end walls 24, 25, and 26, 26 whose inner faces slope outward slightly as they ascend, so that the chamber as a whole expands upward. Powdered fuel with somewhat more than carrying air is fed in through a plurality of downward directed burners 27 (see especially Fig. 3) mounted in the roof 14 across the front of the combustion chamber and is ignited by the heat of the front wall 24. Air additional to that entering at the burners 27 is (or may be) supplied lower down through openings 28 at various heights and positions in the front wall 24, so as to mingle with the descending stream from the burners 27 and afford a sufficient excess of air to assure complete combustion. The burning stream of mingled air, powdered fuel, and combustible gases from the fuel descends in the front of the chamber 15 until its momentum is overcome by the upward draft through the boiler; it then ascends and passes from the combustion chamber to the first (upward) pass of the boiler as already described,—all about as diagrammatically indicated by the arrows in Fig. 3. The contiguity of the unbaffled upward and downward fuel and flame streams in the rather narrow but unobstructed chamber 15 and their change of direction as described above assures rapid and complete combustion in the combustion chamber.

The relatively heavy incombustible residue from the fuel falls or is precipitated toward the floor and on the sides of the combustion chamber, in a finely divided and molten condition. That falling directly to the floor is cooled encounters a cooling zone maintained in the chamber below the region of combustion by a "water screen" consisting of a couple of oppositely inclined banks of tubes 31 and 32 which extend across the combustion chamber. Thus cooled below fusion temperature, these fine particles collect on the bottom of the chamber as a dust which can easily be sucked out or otherwise removed,—instead of as a layer of molten slag which when cool would form a solid mass. The screen absorbs radiant heat from the deposit and thereby maintains the temperature thereof sufficiently low to prevent refusion. Just above the upper bank of tubes 32, the refractory lining of the combustion chamber 15 is undercut all the way around, at 33, in a couple of sharp-angled rabbets or "steps," thus making an abrupt overhang of the walls 24, 25, 26 that causes the molten slag running down them to drop off in nodules which are cooled by the screen, so as to reach the floor of the chamber 15 in a solidified, or unmolten state.

The oppositely inclined tubes of the banks 31 and 32 are arranged in alternation. Tubes 31 of the lower bank and tubes 32 of the upper bank are connected, in groups comprising two or three tubes of each kind, to headers 35 at the front of the furnace; and the tubes belonging to the two banks which are thus interconnected by the headers 35 are themselves connected to lower and upper inlet and outlet headers 36 and 37 respectively. Tubes 38 extending forward from the rear boiler header 12 in the bottom row of the bank 13 are bent and extended downward in and through the return chamber 20, carried on down through the forward walls of the cinder hoppers 22, and connected to the inlet headers 36 of the parallel groups of tubes just described, to serve as supply connections for the water screen formed by these tubes 31 and 32; and tubes 39 extending rearward from the front boiler header 11 in the bottom row of the tank 13 are similarly bent and extended downward in and through the return chamber 20 and the hopper walls and connected to the outlet headers 37 of the U groups to serve as discharge connections for the water screen. Thus the water screen is connected into the boiler circulation in parallel with the boiler tubes 13 and acts to reinforce the circulation forward from the rear header 12 through the boiler tubes to the front header 11.

The temperatures obtaining in the highly heated upper portion of the combustion chamber 15 are so very great that a wall or inner lining of even the most refractory materials commercially available would be kept continually fused over its inner surface and ready to "run" under the influence of the currents of gas and of the molten "slag" precipitated and adhering thereon; so that if the furnace were of ordinary construction, its refractory walls or inner lining would be speedily destroyed. To protect and preserve the refractory wall or lining from these deteriorating influences of intense heat and adherent slag, I provide for artificially cooling it below such "slagging temperatures" and to such a degree that not only will it remain entirely unfused, but that a thin layer of slag will solidify and be constantly maintained over its entire inner surface, thus at once protecting it and affording a margin of safety against destructive overheating. This cooling I prefer to effect by external passage or circulation of cooling air over the upper portion of the lining which encloses the high heat zones of the combustion chamber 15.

Accordingly, it will be seen from Figs. 3, 4, 5 and 6 that while the lower portions of the walls 24, 25 and 26 surrounding the cooling zone of the combustion chamber 15 are solid (consisting of an inner layer 40 of extremely refractory material; an intermediate layer 41 of ordinary refractory material; and an outer retaining shell or wall 42 of material for the most part not especially refractory, such as ordinary brick), the upper portions of these walls that surround the high heat zones in the upper portion of the combustion chamber 15 are hollow, consisting only of the inner refractory wall or shell 40 and the outer retaining shell or wall 42,—the latter reinforced and made more effectually thermo-insulative by a layer 43 of hollow tile laid in alternate courses with ordinary brick against its inner side. In the thickness of the double combustion chamber wall, therefore, there is an extended space 44 for cooling air completely surrounding the high heat or temperature zones of the combustion chamber. This mural interspace 44 is closed at the tops of the walls by a refractory coping 45. By circulation of air through the extended passage 44 thus afforded the substantially isolated inner refractory wall 40 can be effectually cooled throughout.

At the level of nearly every one of the air-admission openings 28 in the front wall 24 is a horizontal septum 46 (Figs. 3 and 4) formed by fire brick projecting or built outward from the inner refractory wall 40. These septa 46 extend all the way across the front wall 24, across the end walls 26, 26, and various distances across the rear wall 25, thus dividing the air space 44 in parallel into separate horizontal air circulation passages 47 at different heights around the combustion chamber 15 and affording a means of controlling the distribution of cooling air over the walls 40. In the rear wall 25, vertical refractory septa 48 extend down from the ends of the horizontal septa 46 to the bottom of the air space 44, so as to form vertical air passages 49 leading up to the opposite ends of each of the extended horizontal passages 47. Being, as here shown, unattached to the outer wall, the septa 46 and 28 do not interfere with the freedom of expansion and contraction of either wall, nor impair the virtual isolation of the inner from the outer wall as against direct conduction of heat. Also, they brace and strengthen the inner wall 40 structurally. At the lower end of each of these vertical passages 49 is an air intake 50 opening through the outer retaining wall 42 (here of refractory construction, on account of the numerous heat-conducting connections to the inner wall 40 formed by the septa) to the rear of the furnace.

Provision is made for admission or supply of outside air to the combustion chamber 15 directly through the front wall 24 at each of the openings 28 in the inner lining 40 by means of suitable refractory conduits 51 built into the walls 40 and 42, and extending across the cooling space 44; and this admission of outside air may be regulated in amount at each opening 28 by means of an adjustable damper 52 mounted in an externally flanged intake piece 53 which is itself built into the outer wall 42. Provision is made for admission of the warmed cooling air from the circulating passages 47, 49 at each of the openings 28 by means of ports 54 in the lower sides of the conduits 51, and this admission of warmed cooling air may be regulated by adjustment of sliding dampers 55 inside said conduits.

By proper correlative adjustment of the dampers 52 and 55, the amount and temperature of the air admitted at each of the openings 28 can be regulated to meet the varying requirements of different fuels and rates of combustion. The circulation of cooling air through the passages 47, 49 around the combustion chamber 15 can be concurrently regulated by the same means to secure just the right temperature for the inner surface of the wall 40,—so as to avoid injury to the wall by overheating or impairment of the furnace efficiency by overchilling. This concurrent regulation of air circulation and air admission by means of the dampers 52 and 55 offers no practical difficulties, because when large amounts of fuel supplied through the burners 27 require liberal air admission for efficient combustion; the high heat produced in the furnace will require liberal circulation of cooling air to protect and preserve the walls.

The air cooling of the combustion chamber wall 40 permits full advantage to be taken of the water screen 31, 32 to minimize the admission of air at the openings 28, and thus to improve the general efficiency of the installation. In other words, such provisions for cooling and protecting the front of the combustion chamber and maintaining a cooling zone in its lower region make it unnecessary to admit at 28 an excess of cool air (over and above the air required to assure complete combustion) in itself sufficient to protect the front portions of the wall 40 and to maintain an effective cooling zone in the bottom of the combustion chamber,—according to previously existing practice with powdered fuel furnaces of the general type here illustrated. Such an excess of air necessarily reduces the final temperature of the furnace gases, and thereby lowers the overall furnace and boiler efficiency as expressed in evaporation per unit of fuel used.

From Figs. 5 and 6, it will be seen that the hollow tile 43 at the inner side of the structural outer shell or wall 42 are laid to permit passage of air through and from the hollow tile in the front wall 24 to and through those of the end walls 26 and vice-versa, and likewise between the latter and the cooling air passages 47 and 49.

Figure 4:
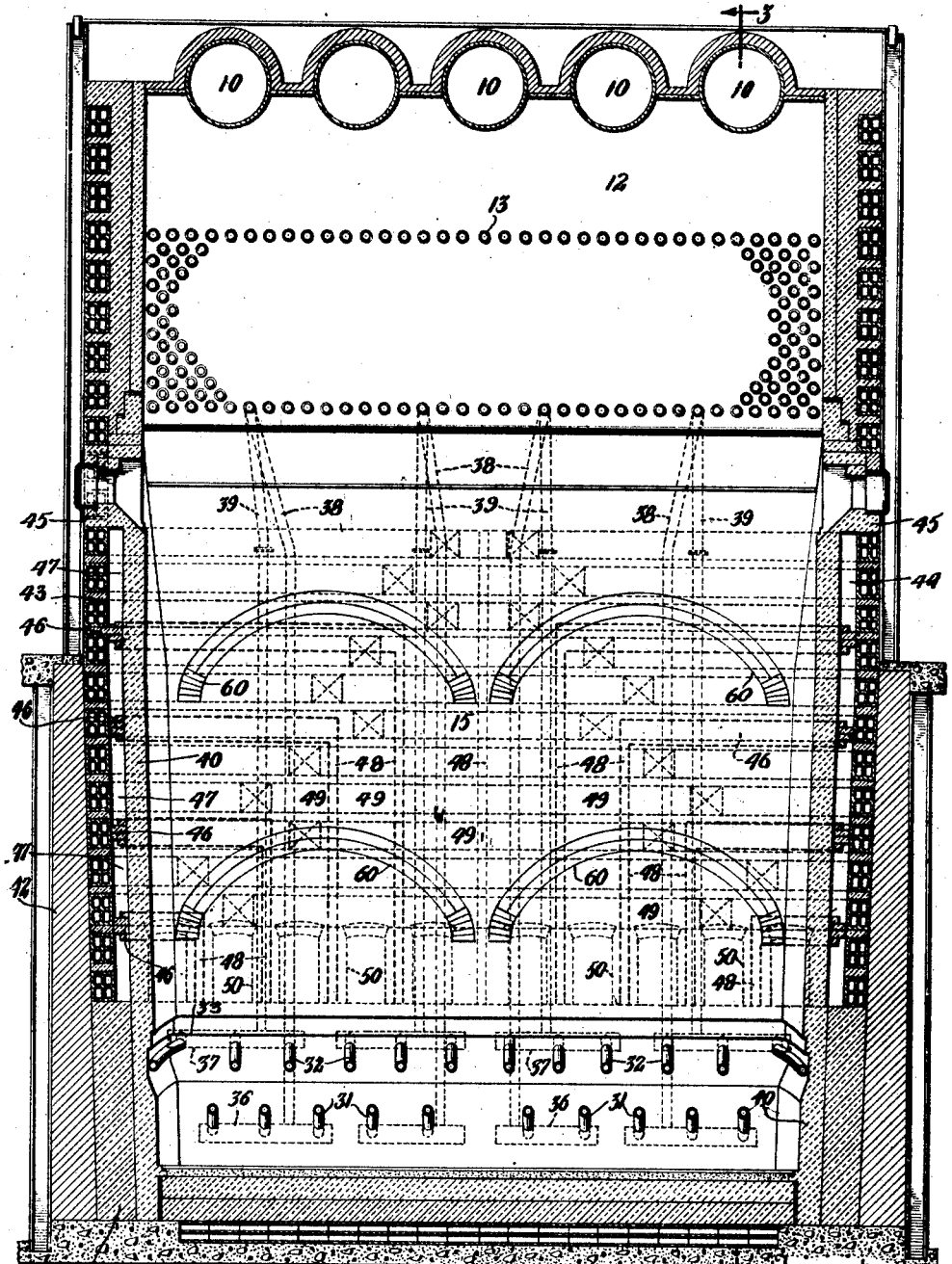
Fig. 4 shows a transverse section, taken as indicated by the line 4—4 in Fig. 3.

The limited thickness of the inner refractory walls 40 necessary to secure effective cooling for the preservation of its inner surface and the limited isolated lateral support from the outer wall 42 afforded it by the septa 46, 48 make the problem of strength and stability for the wall 40 a difficult one. This difficulty is considerably enhanced by the extreme variation and range of temperature to which the wall 40 is subjected, which give rise to expansion and contraction so great as to make it highly undesirable to unite the ends and sides at the corner of the furnace with any degree of rigidity, or to unite the tops of these walls to the coping 45. I prefer, therefore, to divide the end and side walls 40 from one another at the corners, as clearly shown in Figs. 5 and 6, and to make these walls of curved cross-section horizontally so as to give them inherent individual stability and strength, minimize their dependence on the outer shell for lateral support, and permit contraction and expansion to take place freely. As shown in Figs. 5 and 6, therefore, these walls are "flat-curved,"—i. e., their curvature is so small as compared with their horizontal extent that it does not substantially affect or impair the rectangular character of the combustion chamber. For like reasons, I prefer to simply have the tops of the walls 40 overlap the copping with a slip-joint,—shown as rabbeted at the rear of the furnace. The several walls 40 may also be individually reinforced with one or more built-in arches 60, as shown in Figs. 3 and 4.

The outward sloping of the walls of the combustion chamber increases its volumetric capacity toward the top which is advantageous—for the reason that the fuel and flame stream increases in size as gasification of the particles takes place, and is greatest after it has been turned by the draught and approaches the outlet. Thus complete combustion in the chamber is facilitated and the deposit of slag or "gum" on the absorption surfaces is prevented.

I claim:

1. A quadrangular pulverized fuel combustion chamber with substantially isolated refractory walls flat-curved horizontally for strength and stability.

2. A quadrangular pulverized fuel combustion chamber with substantially isolated walls divided from one another by expansion joints at the corners, and flat-curved horizontally for individual strength.

3. A quadrangular pulverized fuel combustion chamber with substantially isolated refractory walls sloping upward and outward, with isolated external lateral support only, and flat-curved horizontally for individual strength.

4. A substantially quadrangular externally air-cooled pulverized fuel combustion chamber enclosed by substantially isolated refractory walls, so thin as to be kept below slagging temperature at their inner faces by air cooling, and flat-curved horizontally for strength.

5. A substantially quadrangular upward-flaring pulverized fuel combustion chamber affording space and depth for substantially complete combustion of a downward directed fuel stream, and for a cooling zone below the region of combustion, with a thermo-insulative outer shell and thin, refractory outward-sloping inner walls spaced inward from said outer shell to afford an interspace for air cooling, laterally sustained by the outer walls.

6. A substantially quadrangular upward-flaring pulverized fuel combustion chamber affording space and depth for substantially complete combustion of a downward directed fuel stream, and for a cooling zone below the region of combustion, with a thermo-insulative outer shell and thin, refractory outward-sloping inner walls spaced inward from said outer shell to afford an interspace for air cooling, and horizontally curved to minimize dependence on the outer shell for lateral support.

7. A substantially quadrangular pulverized fuel combustion chamber with a thermo-insulative outer shell and thin, refractory inner walls spaced inward from said outer shell to afford interspace for air cooling and detached therefrom for freedom of expansion and contraction, but flat-curved horizontally and strengthened with built-in septa for controlling the distribution of cooling air.

8. In a furnace for burning pulverized fuel, a combustion chamber having a double wall providing an air space at the high temperature zones of the chamber, means extending through said space for supplying air to the combustion chamber, and means for regulably admitting air from said air space to said first means.

9. A furnace for burning powdered fuel comprising a combustion chamber with a powdered fuel burner directed downward thereinto and a double wall with extended air-cooling space therein surrounding the high-heat zones of said chamber, conduits for supplying air to said combustion chamber extending across the cooling space of said wall, and means for the regulated admission of air from said cooling space to said conduits.

10. In a furnace for burning pulverized fuel, a combustion chamber having an air space in the wall thereof, means extending through the wall for admitting air from the exterior to said combustion chamber and also communicating with said air space, and means for independently regulating the air supply from the exterior and from said air space.

11. In a pulverized fuel burning furnace, a combustion chamber having an air space in the walls thereof and having a battery of conduits in the front thereof for supplying air from the exterior into the combustion chamber at various points separated horizontally and vertically, said conduits also communicating with the air space, and means for admitting a downwardly directed stream of fuel in the upper part of the combustion chamber adjacent the front thereof.

12. A furnace of the character described comprising a combustion chamber with refractory inner wall, means for admission of a downward directed fuel stream adjacent its front, an outer shell about said inner wall spaced and substantially isolated therefrom, and a battery of conduits mounted in the front portion of said inner wall, at various points spaced apart horizontally and vertically, and projecting through openings in said outer wall that afford them freedom for relative movement to accommodate expansion and contraction of the walls, said conduits also communicating with the interspace, with provisions for admission of air through said interspace to said conduits.

In testimony whereof, I have hereunto signed my name.

JOHN ANDERSON.